United States Patent
Shimizu et al.

(10) Patent No.: US 12,061,783 B2
(45) Date of Patent: Aug. 13, 2024

(54) DATA MONITOR FOR DETECTING UNINTENTIONAL SHARING OF CONTENT

(71) Applicant: International Business Machines Corporation, Armonk, NY (US)

(72) Inventors: Tomohiro Shimizu, Tokyo (JP); Yuriko Nishikawa, Tokyo (JP); Keiji Miura, Yamato (JP); Shinya Onuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/651,905

(22) Filed: Feb. 22, 2022

(65) Prior Publication Data
US 2023/0266869 A1    Aug. 24, 2023

(51) Int. Cl.
*G06F 3/04842* (2022.01)
*G06F 21/10* (2013.01)
*G06F 40/221* (2020.01)
*H04L 51/063* (2022.01)

(52) U.S. Cl.
CPC .......... *G06F 3/04842* (2013.01); *G06F 21/10* (2013.01); *G06F 40/221* (2020.01)

(58) Field of Classification Search
CPC .... G06F 3/04842; G06F 40/221; G06F 21/10; H04L 51/063; H04L 51/12; H04L 51/32; H04L 67/306; H04L 67/38
See application file for complete search history.

(56) References Cited

U.S. PATENT DOCUMENTS

| | | | | |
|---|---|---|---|---|
| 8,225,396 B1* | 7/2012 | Gauvin | ................. | G06F 21/606 705/325 |
| 8,887,245 B1* | 11/2014 | Wiltzius | .............. | H04L 63/1433 726/4 |
| 9,117,058 B1* | 8/2015 | Ansari | .................. | G06F 21/105 |
| 9,940,482 B1* | 4/2018 | Nichols | ............... | G06F 21/6263 |
| 10,255,445 B1* | 4/2019 | Brinskelle | ............. | G06F 21/606 |
| 2009/0164447 A1* | 6/2009 | Daya | .................. | G06F 16/9535 707/999.005 |
| 2012/0005147 A1 | 1/2012 | Nakakoji | | |

(Continued)

FOREIGN PATENT DOCUMENTS

| | | | |
|---|---|---|---|
| JP | 2012014310 A | 1/2012 |
| JP | 2013030067 A | 2/2013 |

(Continued)

OTHER PUBLICATIONS

"Firefox Monitor", Sep. 4, 2021, 3 pages, <https://monitor.firefox.com/>.

(Continued)

*Primary Examiner* — Mahelet Shiberou
(74) *Attorney, Agent, or Firm* — Anthony Mauricio Pallone; Andrew D. Wright; Calderon Safran & Wright P.C.

(57) ABSTRACT

A method, computer program product, and computer system are provided. A processor identifies a webpage currently being viewed by a user. A processor accesses the webpage using a public account. A processor determines shared content of the webpage. A processor, in response to a public (Continued)

view of the webpage including unapproved shared content, generates an indication of the unapproved shared content within the user's view of the webpage.

17 Claims, 4 Drawing Sheets

(56) References Cited

U.S. PATENT DOCUMENTS

| | | | | |
|---|---|---|---|---|
| 2014/0282977 | A1* | 9/2014 | Madhu | H04L 63/1433 726/7 |
| 2015/0113664 | A1* | 4/2015 | Aad | G06V 40/172 726/27 |
| 2017/0004331 | A1* | 1/2017 | Weldon | G06T 11/60 |
| 2019/0147178 | A1* | 5/2019 | Baldwin | H04L 51/52 726/28 |
| 2020/0092484 | A1 | 3/2020 | Ito | |
| 2020/0153847 | A1 | 5/2020 | El-Moussa | |
| 2020/0351269 | A1 | 11/2020 | Steinberg | |
| 2021/0042443 | A1 | 2/2021 | Wang | |

FOREIGN PATENT DOCUMENTS

| | | |
|---|---|---|
| JP | 2019519008 A | 7/2019 |
| JP | 2020046825 A | 3/2020 |

OTHER PUBLICATIONS

"Structural analysis of web pages and extraction of metadata candidates", printed on Oct. 7, 2021, 9 pages, <https://www.anlp.jp/proceedings/annual_meeting/2010/pdf_dir/D4-5.pdf>.

Disclosed Anonymously, "Automatic context-based alerts for content sharing", An IP.com Prior Art Database Technical Disclosure, IP.com No. IPCOM000252277D, IP.com Electronic Publication Date: Jan. 3, 2018, 6 pages.

Disclosed Anonymously, "Automatic detection of sensitive content", An IP.com Prior Art Database Technical Disclosure, IP.com No. IPCOM000252938D, IP.com Electronic Publication Date: Feb. 22, 2018, 6 pages.

Disclosed Anonymously, "System and Method for Sensitive Personal Detector for Social Sharing", An IP.com Prior Art Database Technical Disclosure, IP.com No. IPCOM000249065D, IP.com Electronic Publication Date: Jan. 31, 2017, 3 pages.

Hunt, Troy, "Who is behind Have I Been Pwned (HIBP)", Who, what & why, Sep. 4, 2021, 2 pages, <https://haveibeenpwned.com/>.

Shareef et al., "A Collaborative Access Control Model for Shared Items in Online Social Networks", The University of Western Ontario, Nov. 24, 2014, 153 pages.

Tsuruta et al., "An Extraction Method of an Informative DOM Node from a Web Page by Using Layout Information", Jun. 25, 2010, 15 pages, <https://www.jstage.jst.go.jp/article/tjsai/25/6/25_6_742/_pdf>.

* cited by examiner

DATA MONITOR FOR DETECTING UNINTENTIONAL SHARING OF CONTENT

BACKGROUND OF THE INVENTION

The present invention relates generally to the field of data monitoring, and more particularly to detecting web content that is unintentionally accessible by other users.

On many websites and platforms, users are permitted to upload, share and collaborate on a variety of files and data. In some scenarios, when sharing content online, a user chooses one or more other users to share the content with, permitting the user access to the content. In other scenarios, a user may share content publicly with any user of the website or platform. Typically, the accessibility of the content is indicated by the user sharing the content, either publicly or privately among a group of users.

SUMMARY

Embodiments of the present invention provide a method, system, and program product to detect unintentional sharing of content of a webpage are provided. A processor identifies a webpage currently being viewed by a user. A processor accesses the webpage using a public account. A processor determines shared content of the webpage. A processor, in response to a public view of the webpage including unapproved shared content, generates an indication of the unapproved shared content within the user's view of the webpage.

DETAILED DESCRIPTION

Figure 1:
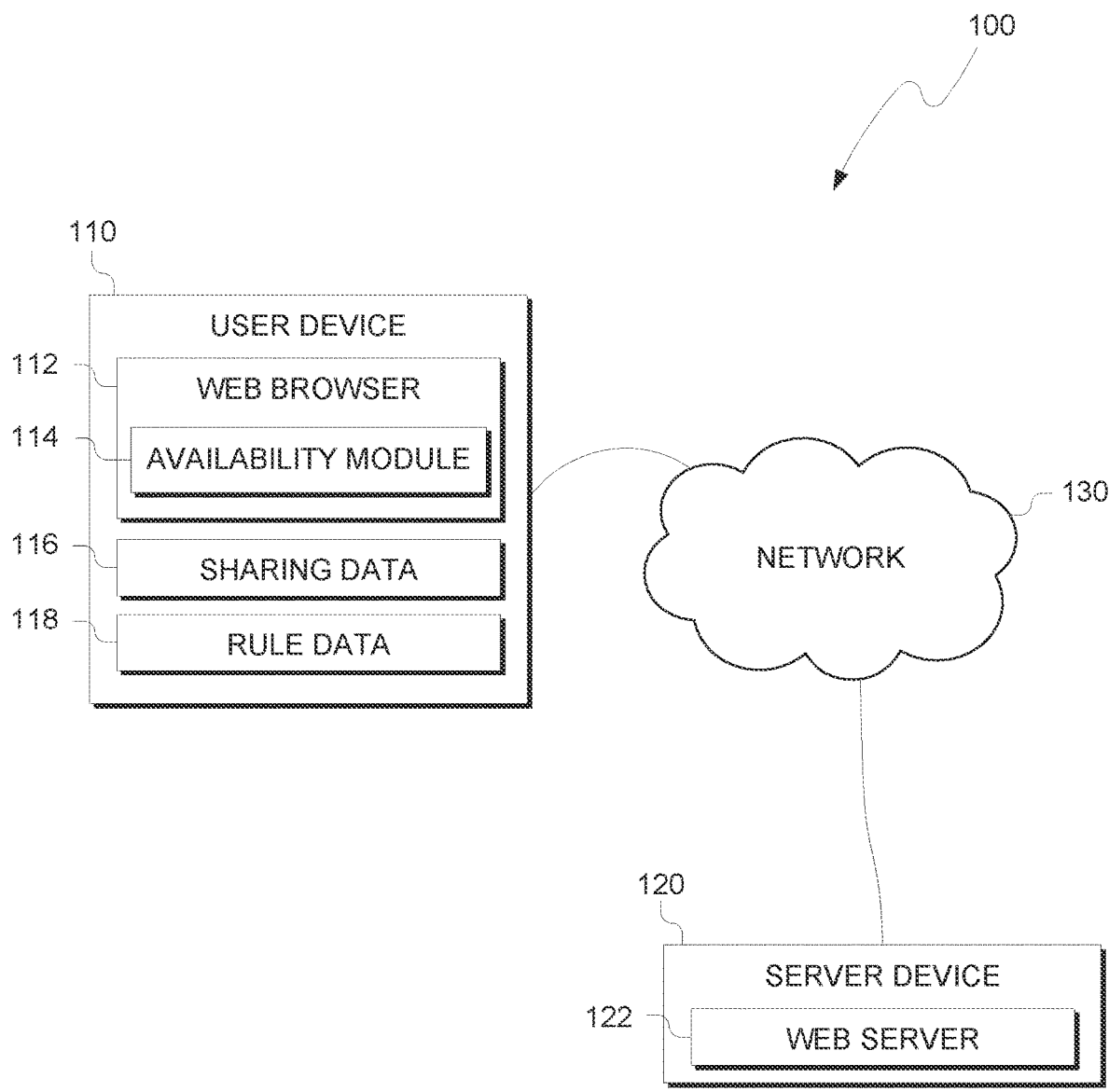
FIG. 1 is a functional block diagram illustrating a networked environment in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 and server device 120 connected over network 130. User device 110 includes web browser 112, availability module 114, sharing data 116 and rule data 118. Sever device 120 includes web server 122.

In various embodiments of the present invention, user device 110 and server device 120 are each a computing device that can be a standalone device, a server, a laptop computer, a tablet computer, a netbook computer, a personal computer (PC), or a desktop computer. In another embodiment, user device 110 or server device 120 represents a computing system utilizing clustered computers and components to act as a single pool of seamless resources. In general, user device 110 and server device 120 can be any computing device or a combination of devices with access to sharing data 116 and rule data 118 and is capable of executing web browser 112, availability module 114, or web server 122. User device 110 and server device 120 may include internal and external hardware components, as depicted and described in further detail with respect to FIG. 4.

In this exemplary embodiment, web browser 112, availability module 114, sharing data 116 and rule data 118 are stored on user device 110; and web server 122 are stored on server device 120. However, in other embodiments, web browser 112, availability module 114, sharing data 116, rule data 118 and web server 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110 and server device 120 in accordance with a desired embodiment of the present invention.

In various embodiments, web browser 112 provides a user with an interface to visit various websites, such hosted a website hosted via web server 122. Web server 122 provides data for a website to the user when requested. Web server 122 sends various data to web browser 112, such as hypertext markup language (HTML), scripts and code, that instructs web browser 112 how to render a webpage of the website. As the user navigates the website via web browser 112, web server 122 delivers additional webpages and other content, such as user uploaded files based on the interactions and requests given by the user to web browser 112. In various embodiments, web browser 112 includes availability module 114. Availability module 114 monitors user-generated content that is currently accessible within the current view of web browser 112. Availability module 114 identifies all user submitted content on the webpage and then, as discussed herein, determines if any of the user submitted content on the webpage may have been shared unintentionally, notifying the user if an unintentional data share may have occurred.

In various embodiments, web server 122 hosts any website that permits users to upload and share content with other users. For example, web server 122 may be a social media platform where users post and share messages, videos, images and other media content with one another. As another example, web server 122 may be a code repository where users post code, libraries, project files and other relevant data for collaborative software development with other users. As another example, web server 122 may be a cloud file storage platform that permits users to share any type of file with other users. One of ordinary skill in the art will appreciate that any website that permits sharing of content among users is applicable to the various embodiments of the present invention.

In various embodiments, availability module 114 monitors rendered webpage elements in web browser 112. For each item identified to be user generated content on the web page, availability module 114 determines if the user generated content has possibly been shared unintentionally with the public. As discussed herein, many websites permit sharing of content with a specific group of users or, conversely, permit the user to share the file publicly. For example, a user on a social media platform can share an image with a family member or the user can post the picture to their profile, such that anyone viewing the user's profile can access or otherwise see the picture.

Figure 3:
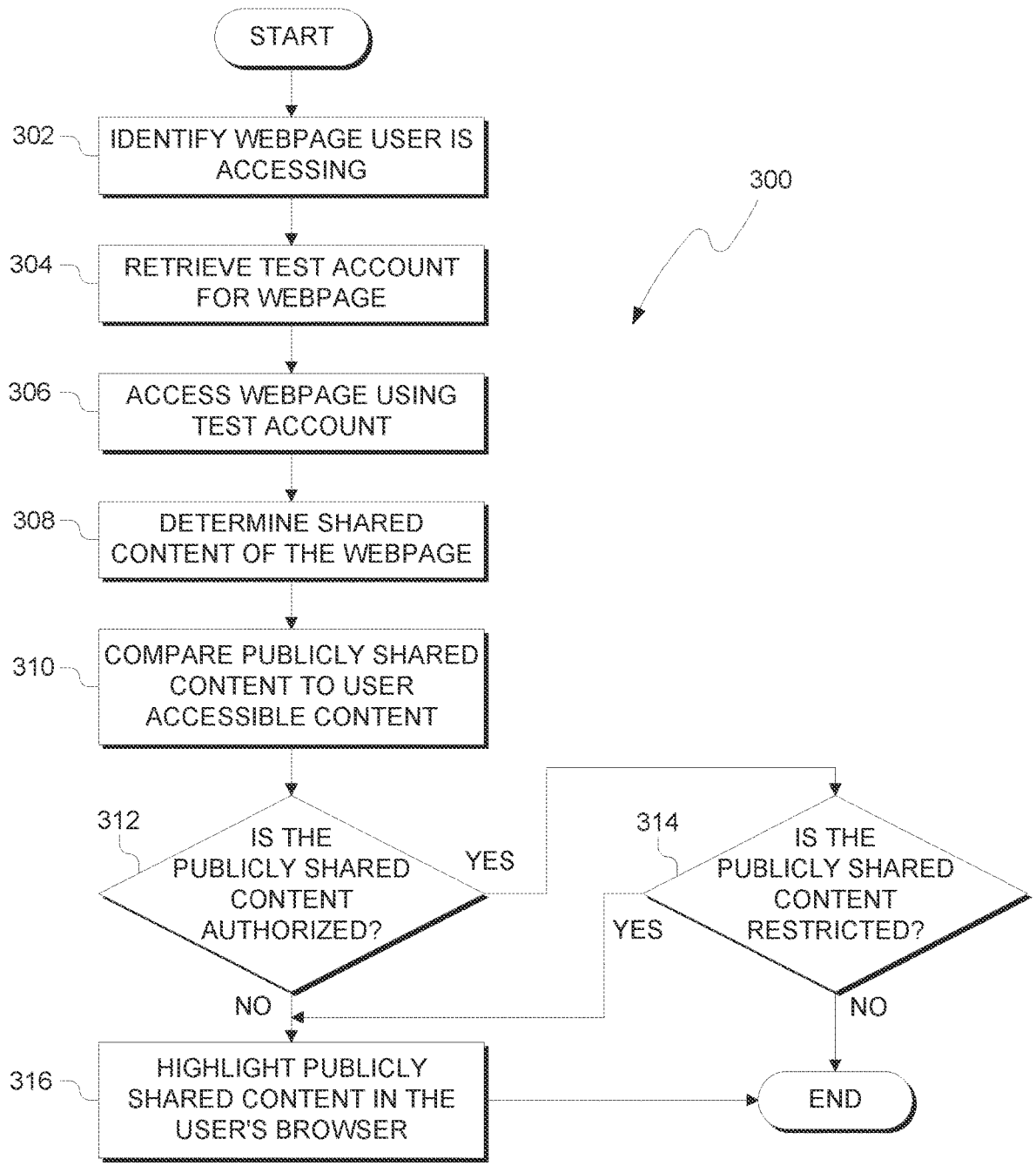
FIG. 3 illustrates operational processes of an availability module for a web browser, on a computing device within the environment of FIG. 1 in accordance with an exemplary embodiment of the present invention.

However, from the user's perspective when viewing the profile page themselves, the extent of sharing the picture may not be conveyed or made clear to the user (i.e., the website does not indicate that an image is publicly shared. As such, many websites provide little certainty to a user regarding the scope that a file is shared let alone if a file is publicly accessible to all users. Embodiments of the present invention recognize that, by directly checking for the public availability of each file or content on a webpage and notifying users of instances where files are publicly available, improvements to the certainty of the accessibility of user-submitted content can be achieved, thereby notifying a user of any content that may be unintentionally posted to the public. The following discusses availability module 114 monitoring currently viewed webpages via web browser 112 for unintentionally shared content, as depicted in FIG. 3. However, one of ordinary skill in the art will appreciate that availability module 114 may perform the following functions and processes without user input or in conjunction with a web browsing session. For example, availability module 114 may actively crawl and monitor the entirety of, or a portion thereof, the website hosted by web server 122 without the user's input. In such a scenario, availability module 114 delivers one or more messages to the user either via web browser 112 or another application indicating the unintentionally shared content.

In various embodiments, availability module 114 monitors various rendered elements of webpages delivered by web server 122 to identify webpage content that includes shared content by the user. In some scenarios, availability module 114 identifies content based on the tags contained in a webpage. For example, if an element in the webpage includes a link to a file, then availability module 114 identifies the link as webpage content that includes shared content by the user. In other scenarios, accessibility module 114 reviews webpages delivered by web server 122 to identify content of the webpages via the Web Accessibility Initiative's (WAI) Accessible Rich Internet Applications (ARIA) suite. ARIA provides a framework for adding attributes to identify features for user interaction in a webpage which include various "Roles" to indicate the type of content each part of a webpage Specifically, Landmark Roles indicate the overall structure of the webpage indicating what is a "Banner" Role for the area at the top of the webpage or "Main" Role indicating the body of the webpage, where user content may reside.

In some embodiments, availability module 114 compares content rendered on the webpage to sharing data 116 to determine if any content on the webpage matches that stored within sharing data 116. Sharing data 116 includes indications or direct copies of content the user has shared or may otherwise information the user wishes to check for any potential public posting (e.g., a user's address or other sensitive information). For content items shared privately among other users, sharing data 116 includes a copy of the content or, in some instances, includes a hash or other representation of the content for comparing content on a webpage to shared data 116, where a hash value is a mapping of a larger file's data to a shorter string of data. For direct copies, availability module 114 evaluates each content item and links to content items on the page. If the files or content match, then availability module 114 identifies the content is present on the webpage. For hash value representations, availability module 114 converts each content item and links to content items on the page to a hash value or similar representation. If the hash values for the content items match a hash value of a file represented in sharing data 116, then availability module 114 identifies the content is present on the webpage.

In some embodiments, availability module 114 determines a similarity score between the currently viewed webpage content and sharing data 116. Even if the content and sharing data 116 are not direct matches, some of the webpage content may include portions of sharing data 116 that a user still wishes to only share with a specific group. If the webpage content contains a portion of sharing data 116 meant for a non-public sharing, availability module 114 determines a similarity score based on the portion of sharing data 116 the webpage content matches. If the portion is above a threshold value, then availability module 114 determines that shared content is present on the webpage. In some scenarios, sharing data 116 may include important information, such as a home address or phone number. In these scenarios, if any portion of the webpage content includes private information or any content the user indicates as such, then availability module 114 determines that the private content is shared on the webpage. In additional scenarios, sharing data 116 includes indication of content the user has shared or otherwise indicates is approved for instances of public sharing. Availability module 114 identifies elements with approved content for public sharing in a webpage but does not alert the user of the sharing when the approved content is present.

In various embodiments, accessibility module 114 identifies each element of the webpage as either shared on non-shared content. When accessibility module 114 identifies shared content, accessibility module 114 attempts to access the shared content using a non-user specific or public connection to web server 122 such that accessibility module 114 access a version of the webpage from the perspective of a normal user. In some scenarios, accessibility module 114 includes credentials for a test account that can be used to access web server 122. Some websites require an account to access and do not provide a mechanism for anonymous users. In such scenarios, accessibility module 114 includes, or is capable of retrieving from another device, account credentials for a test account.

In various embodiments, availability module 114 generates rule data 118. Based on the HTML of the webpage and various elements contained therein, availability module 114 identifies the location of each element based on tags and other element identifiers present in the HTML, as well as any dependent scripts required to render the webpage. For a particular website, availability module 114 builds rule data 118 which indicates the elements and other portions of the webpage that typically contain user content. Rule data 118 includes information indicating the locations, elements or other indica of where on a particular webpage (i.e., for a particular domain, subdomain or type of page within the domain) user generated, and potentially publicly shared, content is typically located. In some scenarios, availability modules 114 retrieves WAI-ARIA roles contained in the HTML of the webpage to determine rule data 118 that indicates the parts or locations of the webpage that contain user generated content that will be tested for public availability, as discussed herein. In other scenarios, availability modules 114 various tags from the HTML of the webpage such as evaluated elements within the <body> tag of the webpage. By including rule data 118 that indicates where the user generated content typically resides in a particular webpage, availability module 114 can quickly scan relevant areas of the webpage while not scanning areas where user-content is not typically present, such as a sidebar or banner portion of a webpage.

Additionally, in various embodiments, rule data 118 also includes indicators of accessibility to determine if content is accessible in a public view (i.e., via a test account). For example, some websites may deploy Hypertext Transfer Protocol (HTTP) file servers for users to retrieve files. If an authorized user accesses the file, then the file server delivers the file to the user. If the user is unauthorized, such as the test account discussed herein, then the file server returns an error message. For web servers, various Status Codes may be provided based on if the file is accessible or inaccessible from public view. For successful retrievals the webserver sends a successful response (e.g., Status Code 200). If accessibility module 114 attempts to access shared content and receives a Successful Response "200 OK" from the web server, then the content is accessible by the public and will be highlighted if the sharing is unintentional. For attempts that result in an error message from the server (e.g., Status Codes 401 or 403) when using the public account, accessibility module 114 determines the content is not publicly viewable by the public and will not highlight the content in the current view of the webpage.

In some scenarios, other servers may utilize a cloud storage system and deliver files and content via scripts contained in the webpage. In such instances, the website may generate a new element such as a pop-up message that indicates either access or improper access. For example, a website may render a preview of the file as a new element on the webpage if the file is accessible. Or, as another example, a webpage may render a new element with a pop-up message saying the file in not accessible. In both scenarios, availability module 114 evaluates the contents of the new element rendered to determine if the file is accessible. If the element contains text indicating inaccessible content (e.g., "Denied", "Not Listed", etc.) then availability module 114 determines the content is not accessible in public view. Otherwise, if the new element does not indicate that the content is inaccessible, then availability module 114 determines the content is accessible in public view, highlighting the content if the sharing was unintentional. In various embodiments, availability module 114 updates rule data 118 for the website based on the type of response given when a public user attempts to access content. Availability module 114 updates rule data 118 based on previous responses and types on webpage elements given for different types of access (i.e., authorized users or public users). In some instances, rule data 118 may be shared among different users of availability module 114 or via a central repository (not shown).

In some embodiments, availability module 114 generates a binary classification model based on supervised machine learning provided by a user. The binary classification model classifies each webpage element as being either the location of user generated and shared and other non-shared elements of the webpage. After notifying a user of unintended sharing, availability module 114 request feedback from the user. The user may click or otherwise select elements rendered in web browser 112 to either include or exclude as being directed towards either shared or non-shared content. If the user changes or suggests an element indicated in a notification of unintended sharing, then availability module 114 trains the binary classification model with the newly suggested change from the user. For example, a user notices that availability module 114 missed an address that is publicly available on a website. The user clicks on the area with the address indicating that the area includes shared content. In response, availability module 114 retrieves the relevant elements name, role and other indicators of the elements selected by the user. Availability module 114 then updates or re-trains the binary classification model such the element is properly classified as shared content in future iterations.

In various embodiments, availability module 114 generates an overlay or otherwise updates the view of a webpage if availability module 114 detects that an area or element of the webpage contains data that is unintentionally shared publicly. As discussed herein, availability module 114 compares sharing data 116 to information on the webpage. If a public or test account can access the information, availability module 114 determines the pages includes publicly shared data. If this sharing is unintentional, then availability module 114 instructs web browser 112 to generate additional visual elements to highlight or otherwise indicate that content and the location of content of the webpages is publicly available. In some instances, availability module 114 instructs web browser 112 to add a border to the element. In other instances, availability module 114 instructs web browser 112 to format text (e.g., add a bold highlight) of an HTML element of the webpage that includes or links to publicly available and unintentionally shared data.

Figure 2:
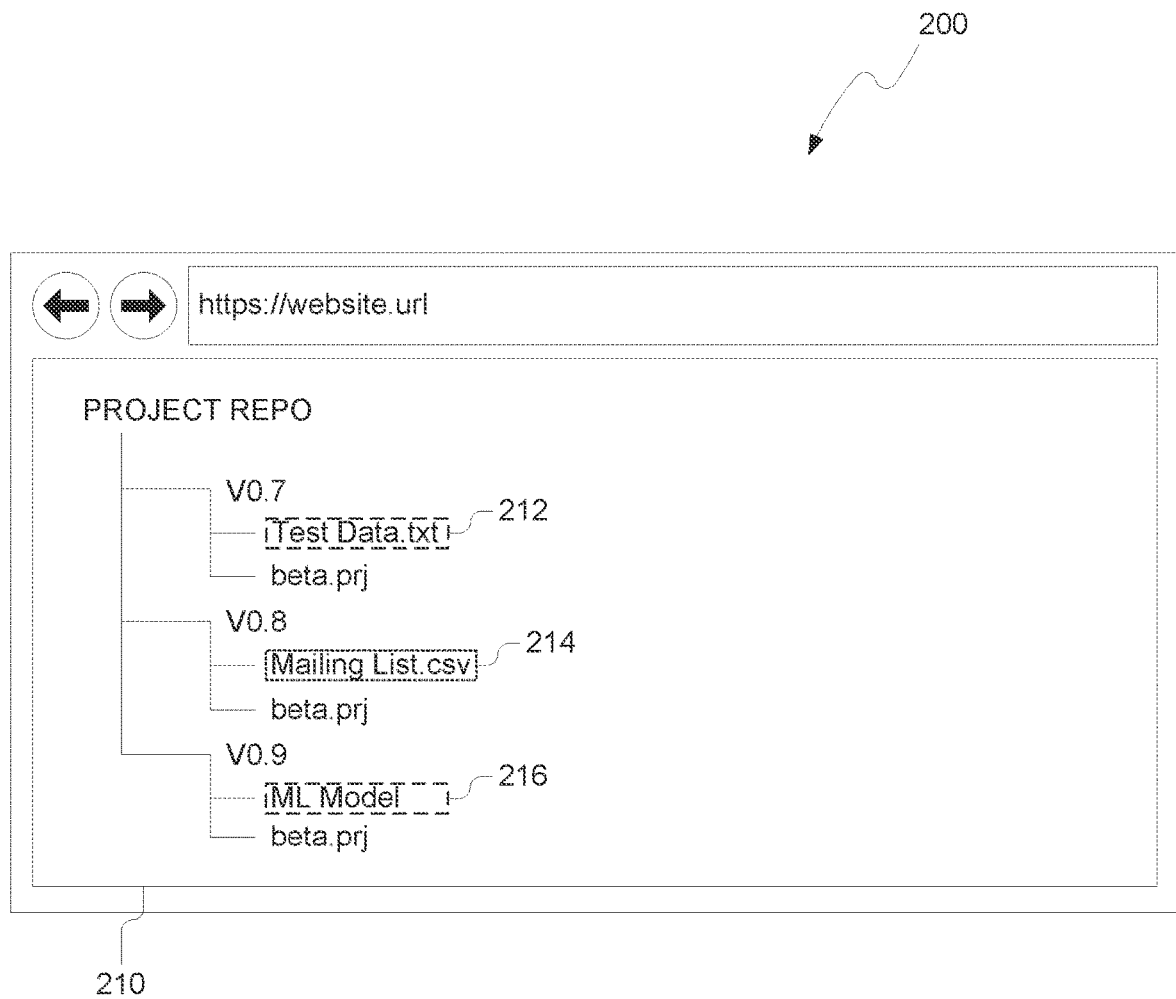
FIG. 2 depicts an example screenshot of indicating publicly shared data while in a private view of a user, in accordance with an exemplary embodiment of the present invention

FIG. 2 depicts an example screenshot, designated as 200, of indicating publicly shared data while in a private view of a user. Screenshot 200 depicts a web browser visiting a website that provides code repository services for programmers and developers to share code and libraries for a software development project. Typically, code repositories permit public sharing of software projects with a public branch or version of the project available for testing by the general public, while a private branch or channel is used by developers to test and develop the project prior to publishing public updates.

Screenshot 200 depicts a rendering of a webpage 210 for a project the user is collaborating on with other users. Webpage 210 includes a listing of files for various versions of the project (e.g., V0.7, V0.8, and V0.9). For each version of the project, the source code "beta.prj" for the version is listed. Additionally, other project files "Test Data.txt", "Mailing List.csv", and "ML Model" are supporting files uploaded and used privately during testing and development of each version.

While viewing the page normally, a developer will have access and see all files in a project hosted on webpage 210. During deployment of each version, a developer selects which files to make public and which to keep private. As discussed herein, availability module 114 checks, via a public test account, what files and elements of webpage 210 are accessible to public users. In this case, the three project files "Test Data.txt", "Mailing List.csv", and "ML Model" are publicly accessible via either a non-account having user or, if required, an account having user that is not a member of the project.

Since each file is publicly available, availability module 114 renders highlights elements 212-216 to indicate the public availability of the files. "Beta.prj" is not highlighted since, although being publicly available, has been added the sharing data 116 indicating that the file is approved for public sharing. As such, availability module 114 does not notify the user of the public availability of "beta.prj". Both highlights 212 and 216 for respective files "Test Data.txt" and "ML Model" are highlighted since they contain files or data that is not approved in sharing data 116. As such, availability module 114 add highlights 212 and 216 (depicted as dashed lines) to indicate that the files are publicly available and not approved for public sharing yet. As such, the user can quickly notice highlights 212 and 216 and either select and add the files to sharing data 116 or remove or change the permissions of the files such that they are no longer publicly available.

Highlight 214 for the file "Mailing List.csv" is generated since the file contains important information. In various embodiments, availability module 114 evaluates the contents of the project files. Based on pattern matching and other machine learning techniques, availability module 114 determines "Mailing List.csv" includes addresses and phone numbers of customers. Based on the large amount of phone numbers and addresses present in the file, availability module 114 determines the file includes important information and generates a different highlight 214, represented by a dotted line, to indicate the important information that is being publicly shared. A user may then select to add the file to sharing data 116 or take corrective steps to remove the file from public view.

FIG. 3 illustrates operational processes, generally designated 300, of availability module 114 for web browser 112. In process 302, availability module 114 identifies the webpage a user is currently accessing in web browser 112. In some scenarios, availability module 114 includes an allowed list of websites that availability module 114 is permitted to evaluate, limiting unnecessary checking of websites without user shared content. In process 304, availability module 114 retrieves a test account for a webpage. In some instances, a website may require a user account to access the webpage. In such instances, availability module 114 retrieves a test account's credentials to log into the webpage. In other instances, where the website is publicly available without user accounts, then availability module 114 does not require the test account.

In process 306, availability module 114 access the webpage currently being viewed by the user. In instances where an account is required, availability module 114 utilizes the retrieve credentials in process 304 to access the webpage. If not, then availability module 114 access the webpage without a test account. In process 308, availability module 114 determines the shared content of the webpage. Based on rule data 118, availability module 114 identifies the portions of the webpage that contain shared, either intentionally or not, content.

In process 310, availability module 114 compares the publicly shared content determines in process 308 to the content accessible to the user via the current view of the webpage in process 302. If the content is not authorized and indicated in sharing data 116 as approved for sharing (NO Branch of decision process 312), then availability module 114 highlights the publicly shared content in the user's web browser (process 316), such as depicted in FIG. 2. If the content is approved and included in sharing data 116 (YES Branch of decision process 312), then availability checks if any of the publicly available content includes restricted or important information (decision process 314). If the content is restricted (YES Branch of decision process 314), then availability module 114 highlights the publicly shared content in the user's web browser (process 316). If not, availability module 114 waits for the user accesses another webpage, thereby repeating processes 300 for the new webpage.

Figure 4:
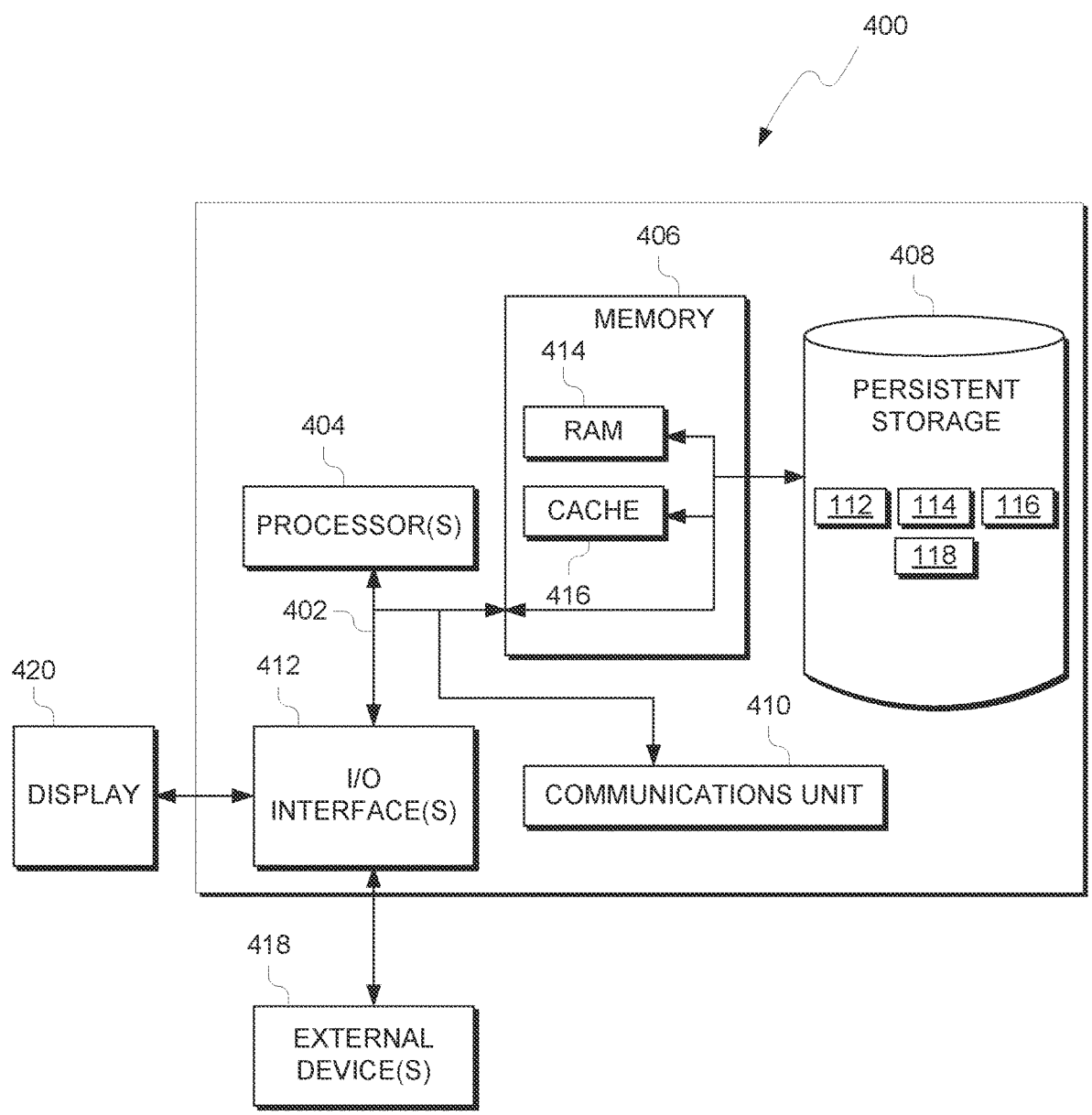
FIG. 4 depicts a block diagram of components of the computing device executing an availability module, in accordance with an exemplary embodiment of the present invention.

FIG. 4 depicts a block diagram, 400, of components of a user device 110 and server device 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

User device 110 and server device 120 each includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Web browser 112, availability module 114, sharing data 116 and rule data 118 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Web browser 112, availability module 114, sharing data 116 and rule data 118 may be downloaded to persistent storage 408 through communications unit 410.

I/O interface(s) 412 allows for input and output of data with other devices that may be connected to user device 110 and server device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., web browser 112, availability module 114, sharing data 116 and rule data 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
identifying, by one or more processors, a webpage currently being viewed by a user;
determining, by the one or more processors, shared content of the webpage based on links contained within the webpage;
determining, by the one or more processors, the shared content of the webpage includes unapproved shared content that is viewable by a non-user specific public account based on a received Hypertext Transfer Protocol (HTTP) status code for accessing the shared content on the webpage with the public account, wherein the HTTP status code indicates that the shared content is accessible in a public view of the webpage, wherein the public view of the webpage attempts to access the shared content utilizing the public account associated with the webpage;
and
generating, by the one or more processors, an indication of the unapproved shared content within the user's view of the webpage based on the HTTP status code, wherein the unapproved shared content is accessible via the public account in the public view of the webpage.

2. The method of claim 1, the method further comprising:
identifying, by the one or more processors, a location of user generated content on the webpage, wherein the shared content is evaluated for approved sharing only in the location of the user generated content.

3. The method of claim 2, wherein the location of user generated content on the webpage is determined based on one or more elements of the webpage as represented by the hypertext markup language (HTML) of the webpage.

4. The method of claim 1, the method further comprising:
identifying, by the one or more processors, a server response to the public view of the shared content; and
in response to the server response indicating that the shared content is accessible in the public view, determining, by the one or more processors, the webpage includes unapproved shared content.

5. The method of claim 4, wherein the server response indicating that the shared content is accessible in the public view is based on receiving a successful response from a server when accessing the shared content in the public view of the webpage.

6. The method of claim 4, wherein the server response indicating that the shared content is accessible in the public view is based on identifying the contents of a new webpage element of the webpage generated in response to the accessing the shared content.

7. A computer program product comprising:
one or more computer-readable storage media and program instructions stored on the one or more computer-readable storage media, the program instructions comprising:
program instructions to identify a webpage currently being viewed by a user;
program instructions to determine shared content of the webpage;
program instructions to determine the shared content of the webpage includes unapproved shared content that is viewable by a public account based on a received Hypertext Transfer Protocol (HTTP) status code for accessing the shared content on the webpage with the public account, wherein the HTTP status code indicates that the shared content is accessible in a public view of the webpage, wherein the public view of the webpage attempts to access the shared content utilizing the public account associated with the webpage;
and
program instructions to generate an indication of the unapproved shared content within the user's view of the webpage based on the HTTP status code, wherein the unapproved shared content is accessible via the public account in the public view of the webpage.

8. The computer program product of claim 7, the program instructions further comprising:
program instructions to identify a location of user generated content on the webpage, wherein the shared content is evaluated for approved sharing only in the location of the user generated content.

9. The computer program product of claim 8, wherein the location of user generated content on the webpage is determined based on one or more elements of the webpage as represented by the hypertext markup language (HTML) of the webpage.

10. The computer program product of claim 7, the program instructions further comprising:
program instructions to identify a server response to the public view of the shared content; and
program instructions, in response to the server response indicating that the shared content is accessible in the public view, to determine the webpage includes unapproved shared content.

11. The computer program product of claim 10, wherein the server response indicating that the shared content is accessible in the public view is based on receiving a successful response from a server when accessing the shared content in the public view of the webpage.

12. The computer program product of claim 10, wherein the server response indicating that the shared content is accessible in the public view is based on identifying the contents of a new webpage element of the webpage generated in response to the accessing the shared content.

13. A computer system comprising:
one or more computer processors;
one or more computer readable storage media; and
program instructions stored on the computer readable storage media for execution by at least one of the one or more processors, the program instructions comprising:
program instructions to identify a webpage currently being viewed by a user;
program instructions to determine shared content of the webpage;
program instructions to determine the shared content of the webpage includes unapproved shared content that is viewable by a public account based on a received Hypertext Transfer Protocol (HTTP) status code for accessing the shared content on the webpage with the public account, wherein the HTTP status code indicates that the shared content is accessible in a public view of the webpage, wherein the public view of the webpage attempts to access the shared content utilizing the public account associated with the webpage; and program instructions to generate an indication of the unapproved shared content within the user's view of the webpage based on the HTTP status code, wherein the unapproved shared content is accessible via the public account in the public view of the webpage.

14. The computer system of claim 13, the program instructions further comprising:

program instructions to identify a location of user generated content on the webpage, wherein the shared content is evaluated for approved sharing only in the location of the user generated content.

15. The computer system of claim 14, wherein the location of user generated content on the webpage is determined based on one or more elements of the webpage as represented by the hypertext markup language (HTML) of the webpage.

16. The computer system of claim 13, the program instructions further comprising:

program instructions to identify a server response to the public view of the shared content; and program instructions, in response to the server response indicating that the shared content is accessible in the public view, to determine the webpage includes unapproved shared content.

17. The computer system of claim 16, wherein the server response indicating that the shared content is accessible in the public view is based on receiving a successful response from a server when accessing the shared content in the public view of the webpage.

* * * * *